United States Patent
Parthe et al.

(10) Patent No.: US 12,512,997 B2
(45) Date of Patent: Dec. 30, 2025

(54) SYSTEM AND METHOD FOR AI-BASED DIGITAL IDENTITY VERIFICATION FIELD OF DISCLOSURE

(71) Applicants: Rahul Parthe, Bloomfield Hills, MI (US); Allan Malcolm, Kuala Lumpur (MY); Neil Rudeforth, Honley (GB); Vishesh Mistry, Alpharetta, GA (US)

(72) Inventors: Rahul Parthe, Bloomfield Hills, MI (US); Allan Malcolm, Kuala Lumpur (MY); Neil Rudeforth, Honley (GB); Vishesh Mistry, Alpharetta, GA (US)

( * ) Notice: Subject to any disclaimer, the term of this patent is extended or adjusted under 35 U.S.C. 154(b) by 74 days.

(21) Appl. No.: 18/595,756

(22) Filed: Mar. 5, 2024

(65) Prior Publication Data
US 2025/0202708 A1    Jun. 19, 2025

Related U.S. Application Data

(60) Provisional application No. 63/463,185, filed on May 1, 2023.

(51) Int. Cl.
*H04L 9/32*   (2006.01)
*H04L 9/00*   (2022.01)

(52) U.S. Cl.
CPC .............. *H04L 9/3231* (2013.01); *H04L 9/50* (2022.05)

(58) Field of Classification Search
CPC ............................... H04L 9/50; H04L 9/3231
USPC ....................................................... 713/186
See application file for complete search history.

(56) References Cited

U.S. PATENT DOCUMENTS

| | | | | |
|---|---|---|---|---|
| 9,984,220 | B2 * | 5/2018 | Chabanne | G06F 21/602 |
| 10,298,396 | B1 * | 5/2019 | Kurani | H04L 9/3226 |
| 10,693,872 | B1 * | 6/2020 | Larson | H04L 9/3231 |
| 10,979,231 | B2 * | 4/2021 | Wei | H04L 9/3297 |
| 11,138,333 | B2 * | 10/2021 | Streit | H04L 9/008 |
| 11,256,801 | B2 * | 2/2022 | Sly | G06N 20/00 |
| 11,323,260 | B2 * | 5/2022 | Wang | H04L 9/3239 |

(Continued)

*Primary Examiner* — Amare F Tabor
(74) *Attorney, Agent, or Firm* — The Rapacke Law Group, P.A.

(57) ABSTRACT

A system for an automated real-time digital identity verification based on predictive analytics of user identity data, including a processor of a digital identity verification (DIV) node configured to host a machine learning (ML) module and connected to at least one verifier entity node over a network and a memory on which are stored machine-readable instructions that when executed by the processor, cause the processor to: acquire an identity verification request associated with a user from the at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document; parse the identity verification request to derive a plurality of key features; generate at least one feature vector based on the plurality of the key features; and provide the at least one feature vector to the ML module configured to execute a predictive model based on underlying neural network configured to produce at least one user identity verification parameter for generation of a user identity verification verdict.

14 Claims, 7 Drawing Sheets

(56) References Cited

U.S. PATENT DOCUMENTS

| | | | | |
|---|---|---|---|---|
| 11,329,980 B2* | 5/2022 | Callahan | | H04L 63/0823 |
| 11,528,143 B2* | 12/2022 | Wease | | H04L 63/0861 |
| 2011/0138176 A1* | 6/2011 | Mansour | | H04L 63/0861 |
| | | | | 713/168 |
| 2013/0283035 A1* | 10/2013 | Tomlinson | | H04L 9/3231 |
| | | | | 713/150 |
| 2018/0374097 A1* | 12/2018 | Hanna | | H04L 63/123 |

* cited by examiner

SYSTEM AND METHOD FOR AI-BASED DIGITAL IDENTITY VERIFICATION FIELD OF DISCLOSURE

FIELD OF DISCLOSURE

The present disclosure generally relates to use and verification of digital identities, and more particularly, to an AI-based automated system for digital identity verification based on predictive analytics of user identity data.

BACKGROUND

Identity has become a vital part of human life as it allows people to participate in society. Identity verification allows humans to either avail of services or contribute to the development of society. There are three actors in an identity life cycle: an authority that issues a credential to a person or entity that can be checked for authenticity and identity binding; verifying or relying party that needs to verify the credential before offering a service and a carrier/owner who carries the issued credential and presents it to a verifying or relying party.

There are several conventional ways of issuing credentials, carrying, and verifying them. The efficacy of the system depends on the ease of issuance and provisioning, carrying and presenting, and the ease of verification. This frictionless usage must be achieved without compromising the security and privacy aspect of the process. Current existing identity credential issuance and verification systems have the following shortcomings. Systems that rely on physical credentials such as plastic cards with chips require purpose-built devices for verification. System that relies on mobile phones for credential storage makes it necessary for the identity carrier to have a phone. Systems that are based on a centralized system or backend have a dependency on internet connection to function.

Meanwhile, use of falsified or fraudulent documents continues to be a major concern for governments and businesses around the world. Fraudulent documents with photo substitution pose significant risks as they facilitate various types of illegal activities, including identity theft, financial fraud, immigration fraud, and other forms of deception. By replacing the original photo with that of another individual, perpetrators can exploit the credibility of the legitimate document, deceive authorities, and circumvent security measures. This can lead to unauthorized access to sensitive information, financial resources, or restricted areas, ultimately compromising the safety and well-being of the person whose identity has been stolen, as well as the integrity of the organizations and institutions affected by the fraud. Furthermore, these fraudulent practices undermine the integrity of official identification systems and can hinder law enforcement efforts, posing substantial threats to societal safety and security.

Identity cards have traditionally been secured using physical security features such as holograms, as well as secure personalization technologies such as laser engraving. However, fraudsters relentlessly continue to challenge document issuers and verifiers by finding new ways to bypass such measures and replace the facial image on the document with a new one. Often, in the online enrolment scenario, the authentication of the document is only carried out by visual software (e.g., Optical Character Recognition/Optical Feature Recognition (OCR/OFR)). Various tools available in the market attempt to use an electronic device with a camera subsystem to detect physical security features on a card, but these are not foolproof and require ideal lighting conditions to work correctly. These systems also do not protect against the alteration of data on a real document and therefore photo substitution and document forgeries are a real problem.

In other cases, identity cards contain a chip, whether contact, contactless (using Near-Field Communication (NFC)) or dual-interface. However, aside from the cost of such smart cards and their associated infrastructure, there is a danger that those relying on them for identity verification fall into the trap of assuming them to be foolproof, because they are digital and presumably protected by cryptography, digital signatures and other technologies. But fraudsters have a convenient way to bypass the system. Remote onboarding or transaction verification via an application with integrated NFC reading requires users to have the latest, NFC-enabled devices. Fraudsters, using older devices, can take a facial selfie and an image of the document with a replaced photo that match perfectly and allow them to fool the software.

Accordingly, an AI-based automated method and system for digital identity verification based on predictive analytics of carrier user' data are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for an automated real-time digital identity verification based on predictive analytics of user identity data, including a processor of a digital identity verification (DIV) node configured to host a machine learning (ML) module and connected to at least one verifier entity node over a network and a memory on which are stored machine-readable instructions that when executed by the processor, cause the processor to: acquire an identity verification request associated with a user from the at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document; parse the identity verification request to derive a plurality of key features; generate at least one feature vector based on the plurality of the key features; and provide the at least one feature vector to the ML module configured to execute a predictive model based on underlying neural network configured to produce at least one user identity verification parameter for generation of a user identity verification verdict.

Another embodiment of the present disclosure provides a method that includes one or more of: acquiring an identity verification request associated with a user from the at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document; parse the identity verification request to derive a plurality of key features; generating at least one feature vector based on the plurality of the key features; and providing the at least one feature vector to the ML module configured to execute a predictive model based on underlying neural network configured to produce at least one user identity verification parameter for generation of a user identity verification verdict.

Another embodiment of the present disclosure provides a computer-readable medium including instructions for acquiring an identity verification request associated with a user from the at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document; parse the identity verification request to derive a plurality of key features; generating at least one feature vector based on the plurality of the key features; and providing the at least one feature vector to the ML module configured to execute a predictive model based on underlying neural network configured to produce at least one user identity verification parameter for generation of a user identity verification verdict.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
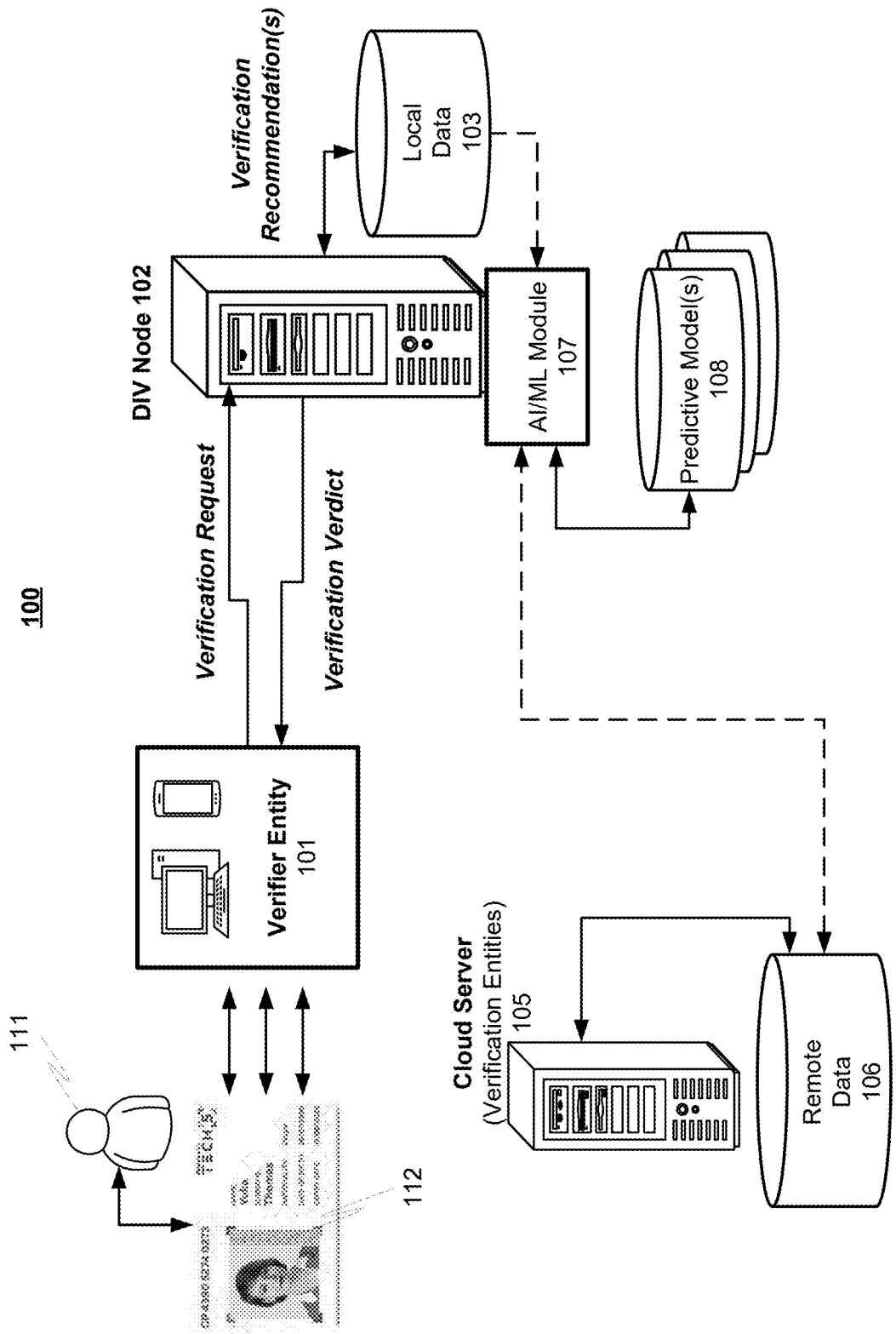
FIG. 1A illustrates a network diagram of a system for an automated real-time digital identity verification based on predictive analytics of user identity-related data consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in, the context of lead-based recommendations, embodiments of the present disclosure are not limited to use only in this context.

The present disclosure provides a system, method and computer-readable medium for an automated real-time digital identity verification based on predictive analytics of user identity-related data. In one embodiment, the system overcomes the limitations of existing user identity verification methods by employing fine-tuned machine learning models configured to generate digital identity verification parameters that may be used for generation of a person's verification verdict. By leveraging the capabilities of the AI and machine learning, the disclosed approach offers a significant improvement over existing solutions discussed above in the background section.

In one embodiment of the present disclosure, the system provides for AI and machine learning (ML)-generated parameters based on analysis of a carrier data. In one embodiment, the proposed system functions as a universal verification tool based on real-time parameters that may be provided by the AI/ML models.

The disclosed embodiments may be platform agnostic. The disclosed system, advantageously, seamlessly integrates with a multitude development tools, enabling users to manage applications through a singular dashboard interface.

In one embodiment, an automated digital identity verification prediction model may be generated to provide for the verification parameters associated with a current user identity based on the current identity-related data. The automated digital identity verification prediction model may use historical users' (carriers') data collected at the current location and at third-party location within the same verification network or even located globally. The relevant verifications' data may include data related to other verified users with the same or similar parameters.

In one disclosed embodiment, the AI/ML technology may be combined with a blockchain technology for secure use of the user verifications'-related data and users' data. A blockchain consensus mechanism may be implemented where multiple nodes or instances of the system validate the user identity based on blockchain consensus. This approach not only provides an additional layer of verification, but also reduces dependency on local databases.

In one embodiment, the user and verifier entities may be connected to the digital identification verification (DIV) node (or may be implemented on the DIV node) over a blockchain network to achieve a consensus prior to executing a transaction to release the user identification decision data based on the identity verification parameters produced by the AI/ML module.

In one embodiment, the digital identity verification verdict(s) may be produced directly on a granular level based on the user identification digital data according to the AI-based predictive analysis. This process includes a transparent recommendations/verdicts mechanism that may be coupled with a secure communications chat channel (implemented over a blockchain network) which supports all clients of the identity verification service. In one embodiment, the secure chat channel may be implemented using a chat Bot.

As discussed above, an answer to solving the fraud problem involving use of documents with swapped photographs is in linking the photo on the document to the document itself at the stage of document generation. The disclosed embodiments provide for a biometric-based security feature that can be printed on an identity document alongside the facial image—as a "digital security feature." This feature is a high-density machine-readable two-dimensional code containing a facial biometric template and/or a facial biometric hash generated from the original facial image. Verification consists of capturing the two together. An application can then compare the template and/or hash in the code with another template and/or hash generated on-the-fly from the printed facial image or from live face capture of the document presenter, all in real time. The solution also involves reading the biographic data printed on the identity document and them comparing it with the biographic data stored in the code. In one embodiment, a shortened (i.e., truncated) biometric hash may be used and the verification process may implement AI processing of the truncated biometric hash. This way less data is sufficient for identity verification.

The disclosed concept is proposed for verifying a credential and associated identity binding using biometrics. The invention involves generating a machine-readable two-dimensional code containing a facial biometric template and/or facial biometric hash, and biographical data extracted from the original application data. Once such a code is generated, it can be printed on an identity document such as ID card, driver's license, passport, etc. containing a printed facial image and biographic data. Once again, this data may be used in a truncated form so less computations are needed. Thereafter, an electronic device with an integrated camera subsystem (including smartphones) can be used to simultaneously read the code, read the printed facial image, and read the printed biographic data using Optical Character Recognition (OCR). The phone may host an AI module or may be connected to the AI module on the cloud. All these extracted data can be used in the following way:

Produce a facial biometric template and/or facial biometric hash (or a truncated hash) using the face image printed on the identity document and/or using the face of the credential presenter in real-time. This biometric template and/or hash can be generated on the device itself (without access to any online database), on a centralized remote server, or on a decentralized service such as blockchain.

Extract the facial biometric template and/or hash from the code and match it to the template and/or hash generated from the printed facial image or from a live capture of the credential presenter. This biometric authentication can be on the device itself (without access to any online database), on a centralized remote server, or on a decentralized service such as blockchain.

Extract biographical data from the code and use OCR to verify the same using the biographic data printed on the identity document. This verification can be performed on the device itself (without access to any online database), on a centralized remote server, or on a decentralized service such as blockchain.

Display feedback on the device on whether the facial biometric template and/or hash was a successful match or not. Display feedback on the device on whether the biographic data was a successful match or not. The feedback may be sent to a centralized or decentralized server.

The identity document may be generated as follows. Typical identity documents such as driver's license, passport, etc. all have a printed facial image along with printed biographic data such as name, birthdate, gender, etc. At the heart of the disclosed embodiments is the high density machine-readable two-dimensional code which can be printed on the identity document either during credential generation or even at a later stage using reliable pasting mechanisms. The machine-readable code is a highly secure data container which is presented as a dense two-dimensional machine-readable code. It is better than other known 2-D codes allowing a safe storage space for biometrics and other personal identifiable information (PII). The proposed code is advantages over other known codes listed below:

While a standard 2-D code can only store up to 3 KB of data, this code can store up to 703 KB of data.

Industry-grade encryption requires a minimum of 2048-bit encryption which other codes cannot accommodate due to their storage constraints. However, the code can support all standard encryption schemes due to its higher capacity.

Other codes include specific patterns in their visual representation which are required for decoding. However, the proposed code does not have any such dependency and can thus start the decoding process immediately.

While other codes have a pre-determined shape of either a square or a rectangle, the code can adapt to any rectangle shape as per requirements.

The code also has a higher tolerance when it comes to error correction. Based on the error correction level, the code is tolerant to noise, occlusion, marks, deformities, and other irregularities.

Most importantly, only an authorized person/authority can decode and read the contents of the code. This is ensured by a three-layer security.

According to the disclosed embodiments, the code provides a number of improvements and changes:

1. Versioning to track various versions of the code for efficient decoding.
2. Innovative 5-bytes expiry date which extends the maximum validity to the year 2500. It can also be changed as per requirements.
3. Storing the DPI (dots per inch) information in a manner that facilitates printers to automatically use it for printing.
4. Selective disclosure—different parts of the code can be unlocked by different keys derived from passwords, private/public keys, stable hash from biometric templates, etc.

Generating the machine-readable code involves following inputs:

Facial Biometric Template and/or Facial Biometric Hash (Truncated)

a. A digital facial image used for printing on the identity document is used as the input here. A typical Automated Facial Recognition (AFR) system can then be used to generate a biometric template using this facial image. This biometric template stores the identity information of the facial image, such that if two templates of the same identity are 'matched', they yield a high similarity score. These biometric templates are typically a list of binary ciphers readable by an algorithm. For multiple faces of the same identity, these facial biometric templates are similar and are rarely same. A truncated hash or template with less data may be used for the AI-based identification as the AI may predict matching parameters to generate a verification verdict.

b. The same facial image can also be used to generate an optional facial biometric hash. Similar to a facial biometric template, it stores the identity information of the provided face. However, the hash is a list of binary numbers (1 or 0) such that for multiple faces of the same identity, the biometric hash is the exact same.

Biographic Data a. This includes biographic data printed on the identity document. This can include name, date of birth, nationality, gender, eye color, document expiry date, etc.

b. All such information is presented in a textual format. However, the machine-readable code stores information as numbers. Thus, any encoding standard can be used to convert these texts to numbers for storage—ASCII (American Standard Code for Information Interchange), Unicode, UTF-8 (Unicode Transformation Format—8-bit), etc.

Once the facial biometric template and/or hash (or truncated light hash) and the biographic data are generated, the data is encrypted and stored in the secure two-dimensional machine-readable code. The code can be generated in any required rectangular shape. For the use cases, it is preferable to generate the code as a thin rectangular strip since that makes it feasible to be placed near the facial image on the identity document without hampering the placement of other information. However, the code can assume any shape as per requirement.

Once the identity document is generated, its authenticity can be verified using the information stored in the machine-readable code. This includes reading the contents of the document and then multi-layer verification using a verifier application on devices with integrated camera subsystems (typically smartphones):

1. Reading and Verifying Facial Data.

The authorized application will have a face detector, face feature extractor, face hash extractor, code detector, and code decoder either on the deployed device or on a centralized or decentralized server/platform.

Once the identity document is presented to the camera, the face detector will detect the face printed on the document. Any typical face detection application can be used for this purpose. Once the face is detected, it is fed as input to the face feature extractor. This feature extractor outputs a fixed-length facial biometric template encompassing the face's identity information. The face can also be fed as input to a typical face hash extractor to output a fixed-length biometric hash of the face identity.

The disclosed embodiments also include proprietary machine learning-based models to detect and extract 136-bytes face biometric templates and 64-bit facial biometric hash. The size of the template and hash can be changed per requirement but will have impact in accuracy since storing more information leads to better performance. However, the use of predictive verification parameters produced by the AI/ML module allows for use of light truncated hashes.

The facial biometric template and/or facial biometric hash can also be extracted from a live capture of the credential presenter using a standard face capture technology. The system uses proprietary face capture technology to detect and capture face while offering real-time guidance to the user.

While the identity document is presented to the camera, the system also employs the code detector and code decoder to detect the printed code and extract all data embedded in it. The code is decoded to output the facial biometric template and/or facial biometric hash and biographic data. The code can also have an expiry date which can inform the verifying authority that the identity document has been expired and needs re-issuance.

The embedded facial biometric template/hash can then be compared to the template/hash extracted from the printed facial image or from a live face capture. This comparison can be carried out using a mathematical function to output a similarity score. A typical range of this score is [0, 1] where 0 means that the two features/hashes are completely different whereas 1 means that the two features/hashes are the same. However, in case of the truncated hash that has some missing data, the determination is made by the AI that ingests some extracted features form the hash and compares them to either full set of features extracted from the printed facial image or from a live face capture.

For facial biometric templates, the similarity score is compared with a statistically pre-determined threshold to decide if it is a successful match or not. For facial biometric hash, the similarity score has to be a perfect score since every bit of the two hashes should be the same.

Reading the verifying biographic data is implemented as follows.

The authorized application may have an optical character recognition (OCR) capability to convert the text from digital or optically captured images to machine-encoded text, either on the device or on a centralized or decentralized server/platform.

While the identity document is presented to the device's camera, the OCR feature will read the image and extract all biographic textual data stored on the document.

As discussed above, the system also includes a code detector and decoder to detect the printed code and extract all data embedded in it. The code is decoded to output the facial biometric template and/or facial biometric hash and biographic data. The facial biometric hash and biographic data hash may be truncated to reduce data processing overhead. Once the biographic data is extracted from the code, it can be compared with the biographic data printed on the identity document. Based on the use-case, a successful verification (i.e., relative match) occurs when either one or multiple biographic parameters are the same or differ within a certain threshold. For the presented identity document to be successfully authenticated, both the face biometric templates/hash and biographic data must be a successful relative match. Relative match means that the extracted features differ within a pre-set threshold. A failure would indicate that the ID has been tampered with and appropriate measures should be taken.

Once the machine-readable code is created, it can be printed on an identity document and presented to a verifying authority for decoding and reading along with the printed facial image. This reading of the code is performed in a number of steps which are described below. Reading the text on the identity document is performed by any standard OCR (optical character recognition) algorithm but it is much more important to read the code. Below steps cater to detecting, processing and reading a physical code using the device's camera subsystem.

1. Code AI SDK to Detect, Crop, and Process the Machine-Readable Code.

There is an exclusive decoder to decode the information in a given code, given its encryption key. However, the user should be given appropriate guidance on how exactly to capture the code for fast and efficient decoding. To facilitate this, a Code Artificial Intelligence (AI) Software Development Kit (SDK) is provided.

The AI SDK takes in an image which may or may not contain a code. It analyzes the image and if a code is detected, it feeds in the detected code to the code decoder while also providing feedback on how the user should present the code to the camera. Feedback will be provided in real-time until the detected code is decoded.

Once an image is fed to the AI SDK, the first parameter it analyzes is brightness. The user is informed if the image presented is too bright or too dark. Although the user is then instructed to adjust the lighting, the code detector still tried to detect a code in the image.

This code detector may use a neural network with the MobileNet V2 architecture trained on 61,000 real and 50,000 synthetic images. It may be deployed as an NCNN model and is only 9.4 MB in size. It takes a color RGB image as input and outputs a mask corresponding to the detected code. The mask is then analyzed to output four points denoting the corner points of a code.

Once the code is detected and the four corner points are found, the original image is passed through a quality model. This quality model is based on a neural network incorporating the MnasNet Small architecture and may be trained using 7000 bad quality and 6000 good quality images containing the code. Here, bad quality denotes images in which the code is present but is in a very bad condition resulting from paper folds, occlusions, marks, low resolution, etc. It is also deployed as an NCNN model and is 1.5 MB in size. It outputs two scores—probability of the image being good quality, and probability of the image being bad quality. If the probability of the image being a bad quality is higher, the feedback that the overall quality is poor is communicated to the user. Else, the process moves on to analyzing the detected code.

Next, the system may analyze the distance of the detected code from the device's camera lens using the width and height of the code in comparison with the original image's dimensions. Based on the appropriate range set according to the use-case, the user is instructed to either bring the code closer or farther away to/from the camera.

If the code's distance from the camera is in the acceptable range, the system may check the code's rotation angle. Ideally, the decoder expects the code in a rectangular fashion and has some rotation tolerance. Thus, the system may detect the code rotation angle based on the position of the detected four corner points. The user is then instructed to correct the rotation angle.

If the code rotation angle is also in the acceptable range, the algorithm checks if the detected code is skewed or not. This is performed by analyzing the detected four corner points of the code. If the skewness is outside the permissible range, the user is instructed to not present the code at an angle.

While all above parameters were analyzed, the detected code was processed and continuously fed to the decoder. The processing involves affine transformation to force the code to a rectangular shape and then relevant image processing algorithms to enhance the code, such as Contrast Limited Adaptive Histogram Equalization (CLAHE). As soon as the decoder is able to successfully read the code, the AI SDK stops the analysis.

Feedback on the quality of a decoded code may be provide as follows.

Once the code decoder is able to successfully read a detected code, the system may analyze how difficult it was for the decoder in achieving this. In particular, since every code has a pre-set error correction level for robustness, the system may analyze how many error correction bytes were utilized during every successful decoding process. This outputs a number is in percentage.

If the code has physical artifacts such as noise, marks, scratches, etc., the percentage of error correction bytes used will be high. In such a case, the user or the issuing authority can be instructed to renew or reissue the code in the identity document.

FIG. 1A illustrates a network diagram of a system for an automated real-time digital identity verification based on predictive analytics of user identity-related data consistent with the present disclosure.

Referring to FIG. 1A, the example network 100 includes the digital identification verification (DIV) node 102 connected to a cloud server node(s) 105 over a network. The DIV node 102 is configured to host an AI/ML module 107.

As discussed above, the DIV node 102 may receive an identity verification request in a form of a carrier user 111 identity-related data from a verifier entity 101, and may output one or more responses including verification recommendation parameters. As discussed above, a digital security feature 112 may be encoded and embedded on the identity document alongside the facial image of the carrier user 111. The digital security features contain machine-readable two-dimensional code.

The identity documents such as driver's license (shown in FIG. 1), passport, etc. all have a printed facial image along with printed biographic data such as name, birthdate, gender, etc. The high density machine-readable two-dimensional code may be printed on or otherwise embedded into the user 111 identity document during credential generation. The machine-readable code is a highly secure data container which is presented as a dense two-dimensional machine-readable code.

At identity document credential generation, a thin, data-reduced facial biometric template in a form of a facial biometric truncated hash is generated. A digital facial image used for printing on the identity document is used as the input for generation of the facial biometric truncated hash. This biometric template stores the identity information of the facial image in a reduced form. Typically, if two templates of the same identity are compared, they yield a high similarity score. However, this may not be the case when the facial biometric truncated hash is used. Truncated hash is missing the data of the complete biometric template. In one embodiment, an AI/ML predictive processing is used to generating reliable verdict when the truncated facial biometric hash is used for encoding lesser encrypted data into the machine-readable two-dimensional code. While the normal-length hash is a list of binary numbers (1 or 0) such that for multiple faces of the same identity, the biometric hash is the exact same. This is not the case if the truncated hash is used.

Accordingly, a truncated hash containing less data may be used for the AI-based identification as the AI/ML module may predict matching parameters to generate a verification verdict.

The digital security feature 112 may also include biographic data printed on the identity document. This can include name, date of birth, nationality, gender, eye color, document expiry date, etc. This data is encoded and may be encrypted.

Once the facial biometric template as a regular or truncated (light) hash and the biographic data are generated, the data is encrypted and stored in the secure two-dimensional machine-readable code inside the digital security feature 112.

Once the identity document is generated, its authenticity can be verified using the information stored in the machine-readable code. The authorized application hosted on the verifier entity 101 may have a face detector, face feature extractor, face hash extractor, code detector, and a code decoder either on the deployed device or on a centralized or decentralized server/platform. Once the identity document is presented to the camera, the face detector will detect the face printed on the document. Once the face is detected, it is fed as input to the face feature extractor. This feature extractor outputs a fixed-length facial biometric template encompassing the face's identity information. The face can also be fed as input to a face hash extractor to output a fixed-length biometric hash of the face identity.

This biometric hash needs to be compared with the decrypted truncated (light) hash derived from the digital security feature 112. As discussed above, the use of predictive verification parameters produced by the AI/ML module allows for use of light truncated hashes. While the identity document is presented to the camera of the verifier entity 101 device, the system employs the code detector and code decoder to detect the printed code and extract all the biographic data embedded in it. The code is decoded to output the decrypted truncated facial biometric hash and decrypted biographic data. Optionally, the data can be encrypted until it arrives to the DIV node 102 where decryption takes place.

The code can also have an expiry date which can inform the verifier entity 101 that the identity document has been expired and needs re-issuance.

The digital identity verification (DIV) node 102 may receive a verification request containing the truncated facial biometric hash and biographic data derived from the digital security feature 112 and the facial biometric hash and biographic data acquired by the verifier entity 101 from the carrier user 111 identity document. Note that the facial biometric hash can also be extracted from a live capture of the user 111 using face capture technology. The system may use proprietary face capture technology to detect and capture face while offering real-time guidance to the user.

In one embodiment, the biographic data may be processed by the DIV node 102 using the pre-trained large language models (LLMs) to derive a language indicator and to parse out the features of the biographic data of the user 111 based on the language indicator metadata. In other words, the key features of the biographic data may be derived from the decoded and the acquired the biographic data based on the language of the textual data.

The DIV node 102 may query a local database for the historical local identification-related data 103 associated with the current user 111 based on some extracted biographic data. The DIV node 102 may acquire relevant remote historical identification-related data 106 from a remote database residing on a cloud server 105 of a third-party digital identity verification system(s). The remote data 106 may be collected from other digital identity verification hosting services, etc.

The DIV node 102 may generate a feature vector or classifier based on the truncated facial biometric hash and biographic data derived from the digital security feature 112 and the facial biometric hash and biographic data acquired by the verifier entity 101 from the carrier user 111 identity document. Additionally, the DIV node 102 may use the historical user 111 identification data (if available, i.e., pre-stored local data 103 and remote data 106). The features derived for the classifier may be indicative of the previous positive and negative user 111 identity verifications.

The DIV node 102 may ingest the feature vector/classifier into an AI/ML module 107. The AI/ML module 107 may generate a predictive model(s) 108 based on the feature vector to predict user identity verification parameters for automatically generating an identity verification verdict. The user identity verification parameters may be further analyzed by the DIV node 102 to map the verification verdict to the verification request data as a key value pair to be used as a training data set for the AI/ML module 107. The identify verification verdict may be generated based on a similarity score that is compared against a statistically pre-determined threshold to decide if it is a successful match that indicates positive identity verification.

Figure 1B:
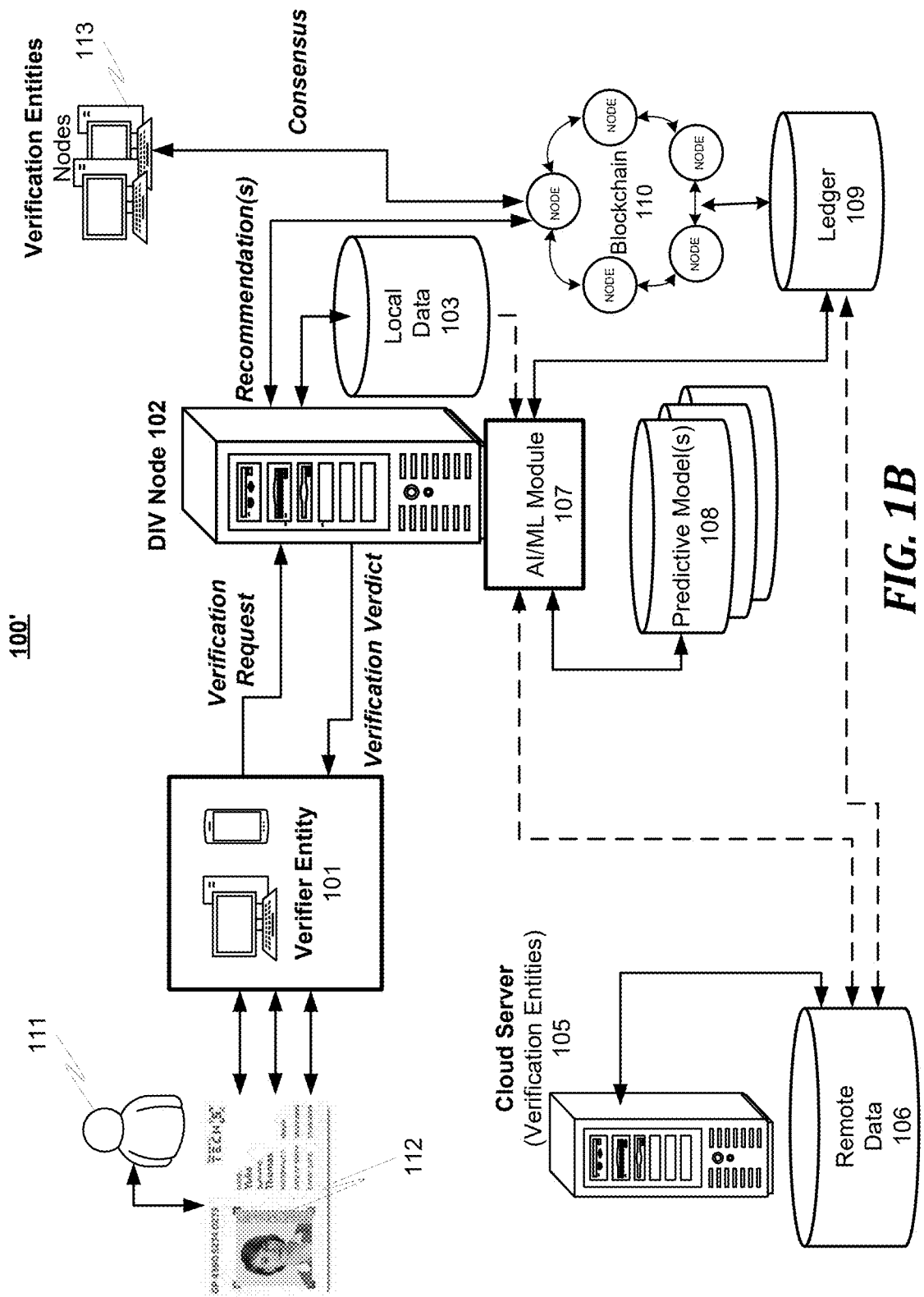
FIG. 1B illustrates a network diagram of a system for an automated real-time digital identity verification based on predictive analytics of user identity-related data employing a blockchain consistent with the present disclosure.

Referring to FIG. 1B, the example network 100' includes the digital identification verification (DIV) node 102 connected to a cloud server node(s) 105 over a network. The DIV node 102 is configured to host an AI/ML module 107.

As discussed above, the DIV node 102 may receive an identity verification request in a form of a carrier user 111 identity-related data from a verifier entity 101, and may output one or more responses including identity verification recommendation parameters. As discussed above, a digital security feature 112 may be encoded and embedded on the identity document alongside the facial image of the carrier user 111. The digital security features contain machine-readable two-dimensional code.

The identity documents such as driver's license (shown in FIG. 1), passport, etc. all have a printed facial image along with printed biographic data such as name, birthdate, gender, etc. The high density machine-readable two-dimensional code may be printed on or otherwise embedded into the user 111 identity document during credential generation. The machine-readable code is a highly secure data container which is presented as a dense two-dimensional machine-readable code.

At identity document credential generation, a thin, data-reduced facial biometric template in a form of a facial biometric truncated hash is generated. A digital facial image used for printing on the identity document is used as the input for generation of the facial biometric truncated hash. This biometric template stores the identity information of the facial image in a reduced form. Typically, if two templates of the same identity are compared, they yield a high similarity score. However, this may not be the case when the facial biometric truncated hash is used. Truncated hash is missing the data of the complete biometric template. In one embodiment, an AI/ML predictive processing is used to generating reliable verdict when the truncated facial biometric hash is used for encoding lesser encrypted data into the machine-readable two-dimensional code. While the normal-length hash is a list of binary numbers (1 or 0) such that for multiple faces of the same identity, the biometric hash is the exact same. This is not the case if the truncated hash is used.

Accordingly, a truncated hash containing less data may be used for the AI-based identification as the AI/ML module may predict matching parameters to generate a verification verdict.

The digital security feature 112 may also include biographic data printed on the identity document. This can include name, date of birth, nationality, gender, eye color, document expiry date, etc. This data is encoded and may be encrypted.

Once the facial biometric template as a regular or truncated (light) hash and the biographic data are generated, the data is encrypted and stored in the secure two-dimensional machine-readable code inside the digital security feature 112.

Once the identity document is generated, its authenticity can be verified using the information stored in the machine-readable code. The authorized application hosted on the verifier entity 101 may have a face detector, face feature extractor, face hash extractor, code detector, and a code decoder either on the deployed device or on a centralized or decentralized server/platform. Once the identity document is presented to the camera, the face detector will detect the face printed on the document. Once the face is detected, it is fed as input to the face feature extractor. This feature extractor outputs a fixed-length facial biometric template encompassing the face's identity information. The face can also be fed as input to a face hash extractor to output a fixed-length biometric hash of the face identity.

This biometric hash needs to be compared with the decrypted truncated (light) hash derived from the digital security feature 112. As discussed above, the use of predictive verification parameters produced by the AI/ML module allows for use of light truncated hashes. While the identity document is presented to the camera of the verifier entity 101 device, the system employs the code detector and code decoder to detect the printed code and extract all the biographic data embedded in it. The code is decoded to output the decrypted truncated facial biometric hash and decrypted biographic data. Optionally, the data can be encrypted until it arrives to the DIV node 102 where decryption takes place.

The code can also have an expiry date which can inform the verifier entity 101 that the identity document has been expired and needs re-issuance.

The digital identity verification (DIV) node 102 may receive a verification request containing the truncated facial biometric hash and biographic data derived from the digital security feature 112 and the facial biometric hash and biographic data acquired by the verifier entity 101 from the carrier user 111 identity document. Note that the facial biometric hash can also be extracted from a live capture of the user 111 using face capture technology. The system may use proprietary face capture technology to detect and capture face while offering real-time guidance to the user.

In one embodiment, the biographic data may be processed by the DIV node 102 using the pre-trained large language models (LLMs) to derive a language indicator and to parse out the features of the biographic data of the user 111 based on the language indicator metadata. In other words, the key features of the biographic data may be derived from the decoded and the acquired biographic data based on the language of the textual data.

The DIV node 102 may query a local database for the historical local identification-related data 103 associated with the current user 111 based on some extracted biographic data. The DIV node 102 may acquire relevant remote historical identification-related data 106 from a remote database residing on a cloud server 105 of a third-party digital identity verification system(s). The remote data 106 may be collected from other digital identity verification hosting services, etc.

The DIV node 102 may generate a feature vector or classifier based on the truncated facial biometric hash and biographic data derived from the digital security feature 112 and the facial biometric hash and biographic data acquired by the verifier entity 101 from the carrier user 111 identity document. Additionally, the DIV node 102 may use the historical user 111 identification data (if available, i.e., pre-stored local data 103 and remote data 106). The features derived for the classifier may be indicative of the previous positive and negative user 111 identity verifications.

The DIV node 102 may ingest the feature vector/classifier into an AI/ML module 107. The AI/ML module 107 may generate a predictive model(s) 108 based on the feature vector to predict user identity verification parameters for automatically generating an identity verification verdict. The user identity verification parameters may be further analyzed by the DIV node 102 to map the verification verdict to the verification request data as a key value pair to be used as a training data set for the AI/ML module 107. The identify verification verdict may be generated based on a similarity score that is compared against a statistically pre-determined threshold to decide if it is a successful match that indicates positive identity verification.

The AI/ML module 107 may generate a predictive model(s) 108 to predict the identity verification parameters in response to the specific relevant pre-stored user'-related identification data acquired from the blockchain 110 ledger 109. This way, the current identity verification parameters may be predicted based not only on the current user identity related-data, but also based on the previously collected heuristics and user'-related identification data associated with the given user identity verification request. This way, the user identity verification parameters and the verification verdict may be recorded on the blockchain 110 ledger 109 for future references. A blockchain 110 consensus among verification entities nodes 113 and the verifier entity 101 may be reached prior to release and recordation of the identify verification verdict.

Figure 2:
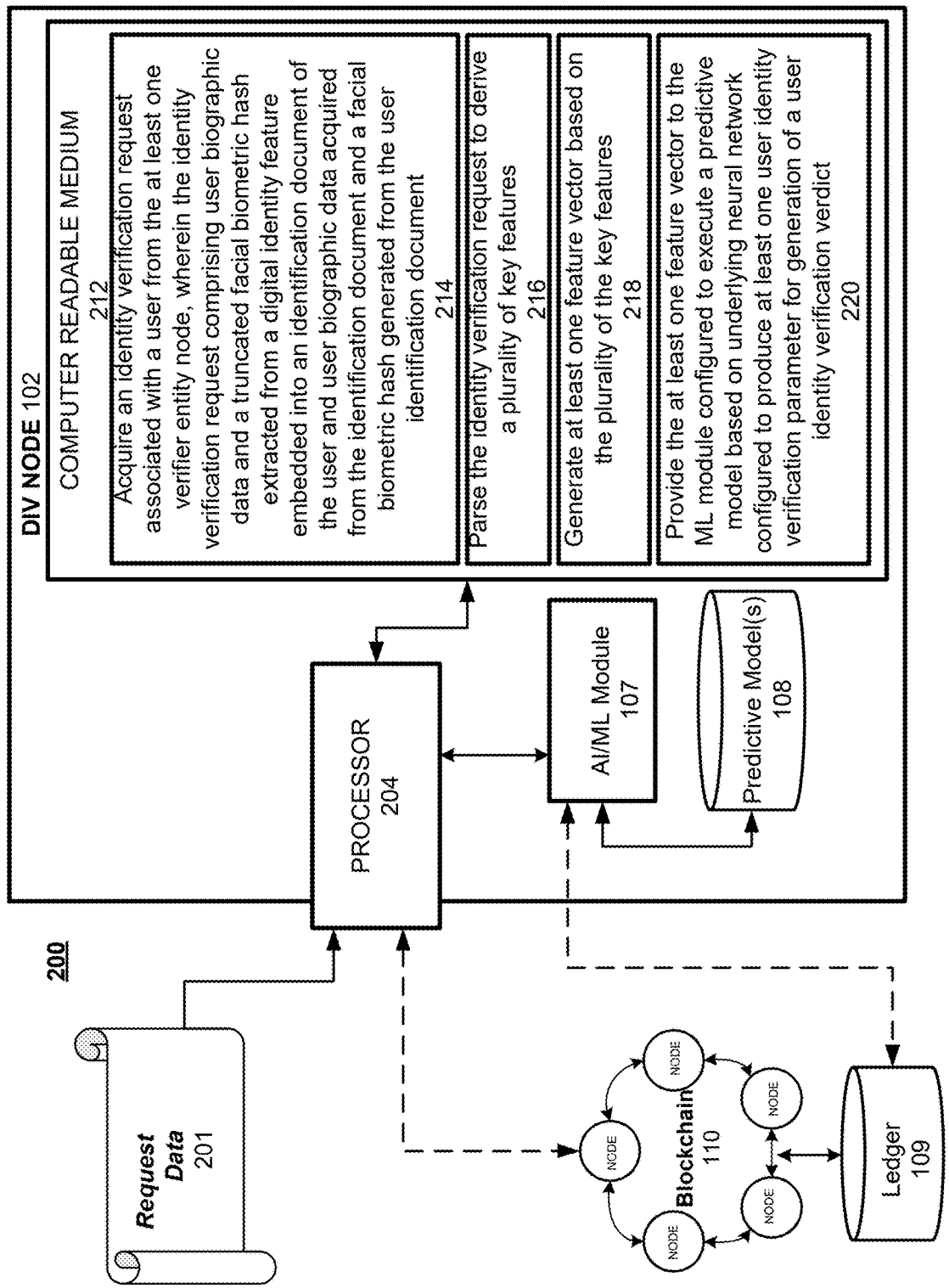
FIG. 2 illustrates a network diagram of a system including detailed features of a digital identification verification (DIV) node consistent with the present disclosure.

FIG. 2 illustrates a network diagram of a system including detailed features of a digital identification verification (DIV) node consistent with the present disclosure.

Referring to FIG. 2, the example network 200 includes the DIV node 102 connected to the verifier entity 101 (see FIGS. 1A-B) to receive user identity-related data 201. The DIV node 102 is configured to host an AI/ML module 107. As discussed above with respect to FIGS. 1A-B, the DIV node 102 may receive the verification request provided by the verifier entity 101 (FIGS. 1A-B) and pre-stored user identity verification data retrieved from local and remote (third-party) databases. As discussed above, the pre-stored user identity verification data may be retrieved from the ledger 109 of the blockchain 110.

The AI/ML module 107 may generate a predictive model(s) 108 based on the received user identity-related data provided by the DIV node 102. In one embodiment, the incoming user identity verification request may be normalized and standardized by a data normalization engine (not shown). As discussed above, the AI/ML module 107 may provide predictive outputs data in the form of user identity verification parameters for automatic generation of the user identity verification verdict. In one embodiment, if one predicted user identity verification parameter deviates from matching by a margin that exceeds a threshold value pre-set for this particular identity verification parameter, the negative verdict may be generated immediately. In one embodiment, once the threshold is met or exceeded by at least one identity verification parameter, the DIV node 102 may provide the currently generated parameter to the AI/ML module 107 to generate an updated user identification verdict.

While this example describes in detail only one DIV node 102, multiple such nodes may be connected to the network and to the blockchain 110. It should be understood that the DIV node 102 may include additional components and that some of the components described herein may be removed and/or modified without departing from a scope of the DIV node 102 disclosed herein. The DIV node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the DIV node 102 may include multiple processors, multiple cores, or the like, without departing from the scope of the DIV node 102 system.

The DIV node 102 may also include a non-transitory computer readable medium 212 that may have stored thereon machine-readable instructions executable by the processor 204. Examples of the machine-readable instructions are shown as 214-220 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire an identity verification request associated with a user from the at least one verifier entity node. The identity verification request may include user biographic data and a truncated facial biometric hash extracted from a digital identity feature embedded into an identification document of the user and user biographic data acquired from the identification document and a facial biometric hash generated from the user identification document (FIG. 1A-B). The processor 204 may fetch, decode, and execute the machine-readable instructions 216 to parse the identity verification request to derive a plurality of key features. The processor 204 may fetch, decode, and execute the machine-readable instructions 218 to generate at least one feature vector based on the plurality of the key features. The processor 204 may fetch, decode, and execute the machine-readable instructions 220 to provide the at least one feature vector to the ML module configured to execute a predictive model based on underlying neural network configured to produce at least one user identity verification parameter for generation of a user identity verification verdict.

The permissioned blockchain 110 may be configured to use one or more smart contracts that manage transactions for multiple participating nodes and for recording the transactions on the ledger 109. Note that the DIV node 102 system prioritizes using its own heuristic data 103 from local databases. This ensures a faster, more tailored response to the identity verification requests. Local datasets may be recorded on a private (permissioned) blockchain 110. This provides a tamper-evident log of user identity verifications, enhancing security and transparency. The blockchain log may also contain a trail of how the ML models 108 have been trained and evolved over time, which offers an auditable history of model adjustments and training.

Figure 3A:
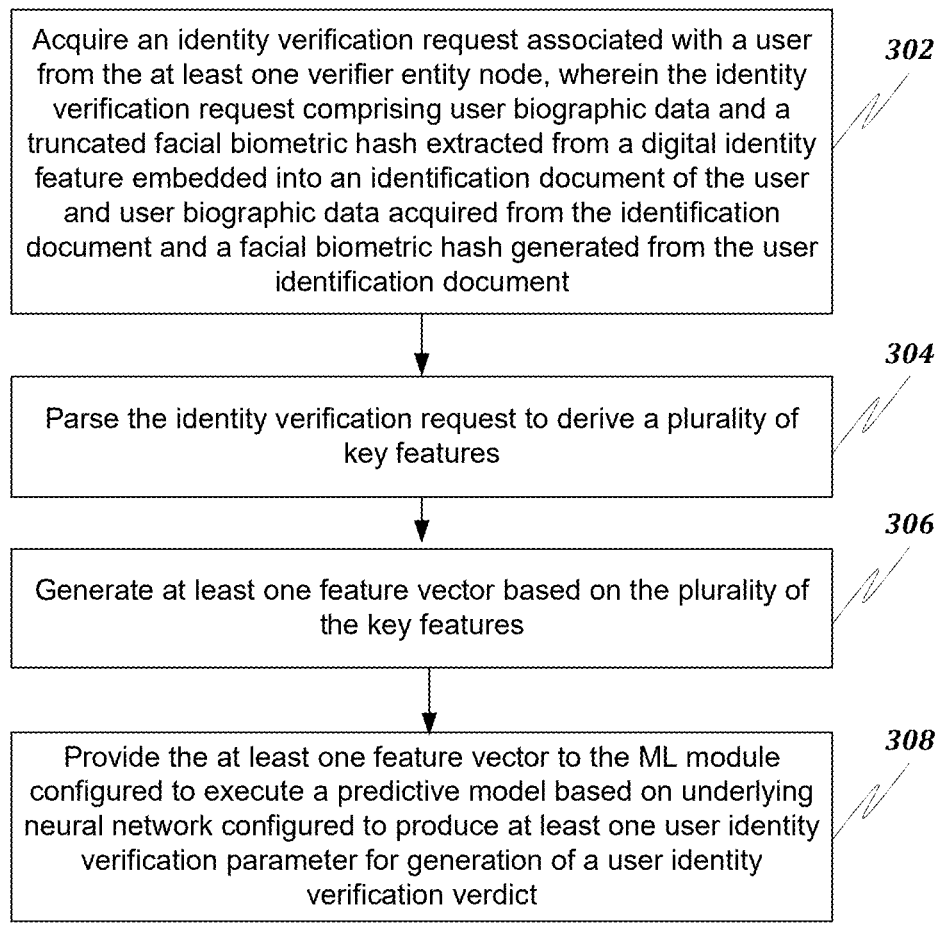
FIG. 3A illustrates a flowchart of a method for an automated real-time digital identity verification based on predictive analytics of user identity-related data consistent with the present disclosure.

FIG. 3A illustrates a flowchart of a method for an automated real-time digital identity verification based on predictive analytics of user identity-related data consistent with the present disclosure.

Referring to FIG. 3A, the method 300 may include one or more of the steps described below. FIG. 3A illustrates a flow chart of an example method executed by the DIV node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the DIV node 102 may execute some or all of the operations included in the method 300.

With reference to FIG. 3A, at block 302, the processor 204 may acquire an identity verification request associated with a user from the at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document. At block 304, the processor 204 may parse the identity verification request to derive a plurality of key features. At block 306, the processor 204 may generate at least one feature vector based on the plurality of the key features. At block 308, the processor 204 may provide the at least one feature vector to the ML module configured to execute a predictive model based on underlying neural network configured to produce at least one user identity verification parameter for generation of a user identity verification verdict.

Figure 3B:
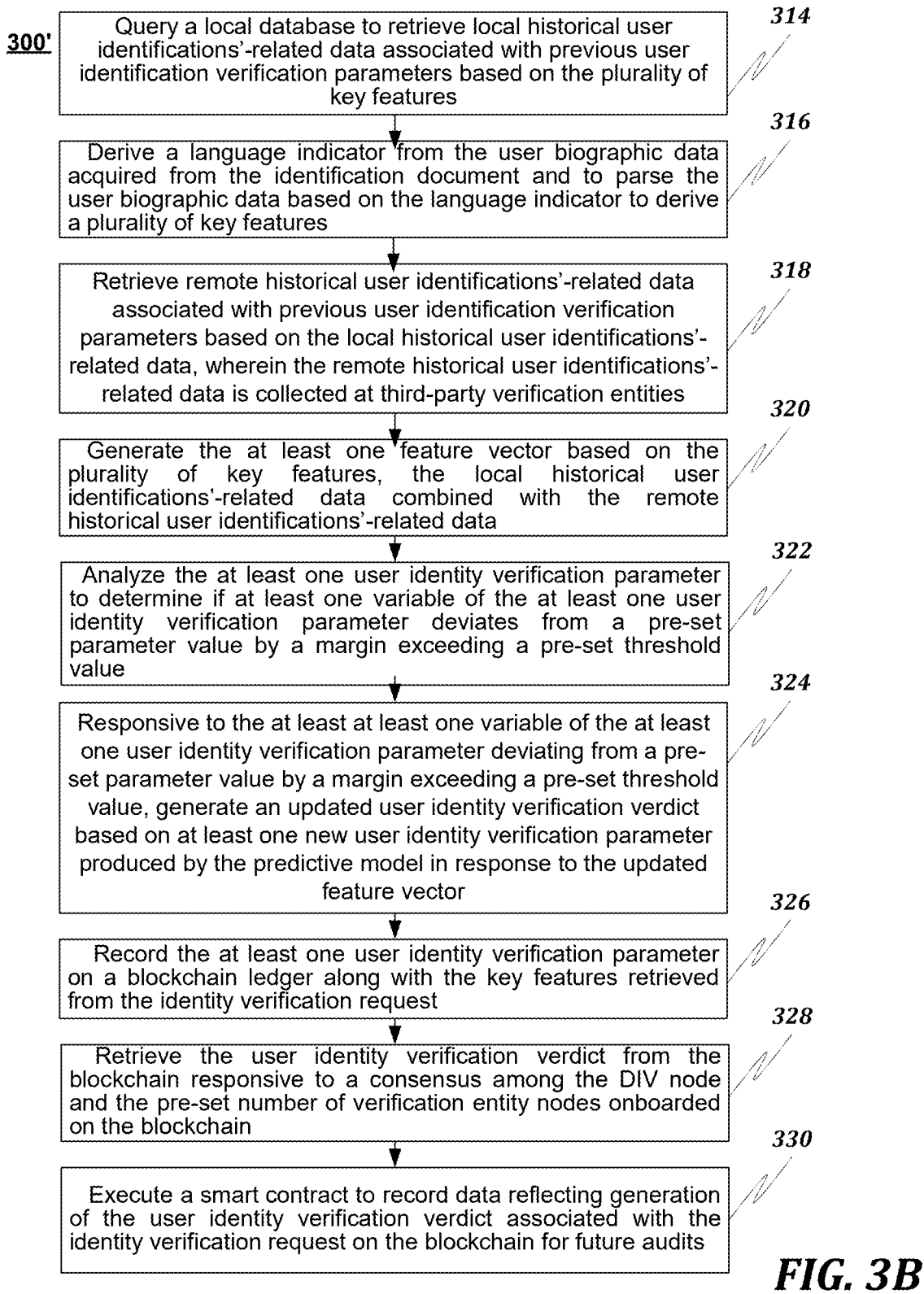
FIG. 3B illustrates a further flowchart of a method for an automated real-time digital identity verification based on predictive analytics of user identity-related data consistent with the present disclosure.

FIG. 3B illustrates a further flowchart of a method for an automated real-time digital identity verification based on predictive analytics of user identity-related data consistent with the present disclosure.

Referring to FIG. 3B, the method 300' may include one or more of the steps described below. FIG. 3B illustrates a flow chart of an example method executed by the DIV node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the DIV node 102 may execute some or all of the operations included in the method 300'.

With reference to FIG. 3B, at block 314, the processor 204 may query a local database to retrieve local historical user identifications'-related data associated with previous user identification verification parameters based on the plurality of key features. At block 316, the processor 204 may derive a language indicator from the note data and to parse the note data based on the language indicator to derive a plurality of key features.

At block 318, the processor 204 may retrieve remote historical user identifications'-related data associated with previous user identification verification parameters based on the local historical user identifications'-related data, wherein the remote historical user identifications'-related data is collected at third-party verification entities.

At block 320, the processor 204 may generate the at least one feature vector based on the plurality of key features, the local historical user identifications'-related data combined with the remote historical user identifications'-related data. At block 322, the processor 204 may analyze the at least one user identity verification parameter to determine if at least one variable of the at least one user identity verification parameter deviates from a pre-set parameter value by a margin exceeding a pre-set threshold value. At block 324, the processor 204 may, responsive to the at least at least one variable of the at least one user identity verification parameter deviating from a pre-set parameter value by a margin exceeding a pre-set threshold value, generate an updated user identity verification verdict based on at least one new user identity verification parameter produced by the predictive model in response to the updated feature vector. At block 326, the processor 204 may record the at least one user identity verification parameter on a blockchain ledger along with the key features retrieved from the identity verification request.

At block 328, the processor 204 may retrieve the user identity verification verdict from the blockchain responsive to a consensus among the DIV node and the pre-set number of verification entity nodes onboarded on the blockchain. At block 330, the processor 204 may execute a smart contract to record data reflecting generation of the user identity verification verdict associated with the identity verification request on the blockchain for future audits.

In one disclosed embodiment, the user identity verification parameters' model may be generated by the AI/ML module 107 that may use training data sets to improve accuracy of the prediction of the identity verification parameters. The identity verification parameters used in training data sets may be stored in a centralized local database (such as one used for storing local data 103 depicted in FIGS. 1A-B). In one embodiment, a neural network may be used in the AI/ML module 107 for the identity verification parameters modeling and identity verification predictions.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 113 and 101 (FIG. 1B) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing lead response parameters for efficient handling of leads, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

Figure 4:
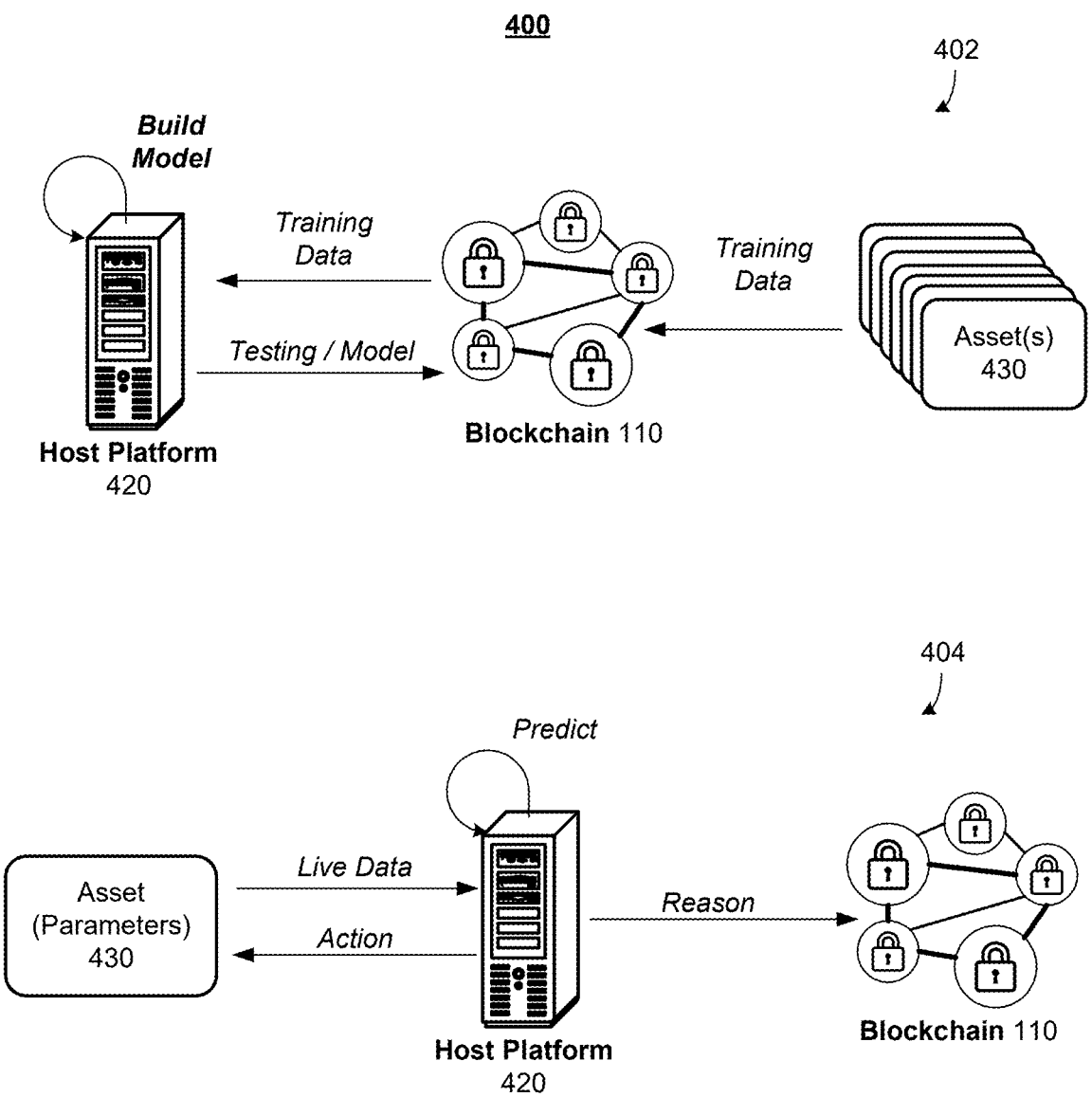
FIG. 4 illustrates deployment of a machine learning model for user identity verification parameters using blockchain assets consistent with the present disclosure.

In the example depicted in FIG. 4, a host platform 420 (such as the DIV node 102) builds and deploys a machine learning model for predictive monitoring of assets 430. Here, the host platform 420 may be a cloud platform, an industrial server, a web server, a personal computer, a user device, and the like. Assets 430 can represent user identification-related parameters. The blockchain 110 can be used to significantly improve both a training process 402 of the machine learning model and the user identity verification parameters' predictive process 404 based on a trained machine learning model. For example, in 402, rather than requiring a data scientist/engineer or other user to collect the data, historical data (heuristics—i.e., identity verification-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the DIV node 102 or from databases 103 and 106 in FIGS. 1A-1B) to the blockchain 110. By using the blockchain 110 to ensure the security and ownership of the collected data, smart contracts may directly send the data from the assets to the entities that use the data for building a machine learning model. This allows for sharing of data among the assets 430. The collected data may be stored in the blockchain 110 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 110 by the host platform 420. Each refinement of the machine learning model (e.g., changes in variables, weights, etc.) may be stored on the blockchain 110. This provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make user identity verification predictions/decisions based on the execution of the final trained machine learning model using the user identity verification parameters. In this example, data fed back from the asset 430 may be input into the machine learning model and may be used to make event predictions such as most accurate user identity verification parameters. Determinations made by the execution of the machine learning model (e.g., verdicts or recommendations or identity verification parameters, etc.) at the host platform 420 may be stored on the blockchain 110 to provide auditable/verifiable proof. As one non-limiting example, the machine learning model may predict a future change of a part of the asset 430 (the identity verification parameters). The data behind this decision may be stored by the host platform 420 on the blockchain 110.

As discussed above, in one embodiment, the features and/or the actions described and/or depicted herein can occur on or with respect to the blockchain 110. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
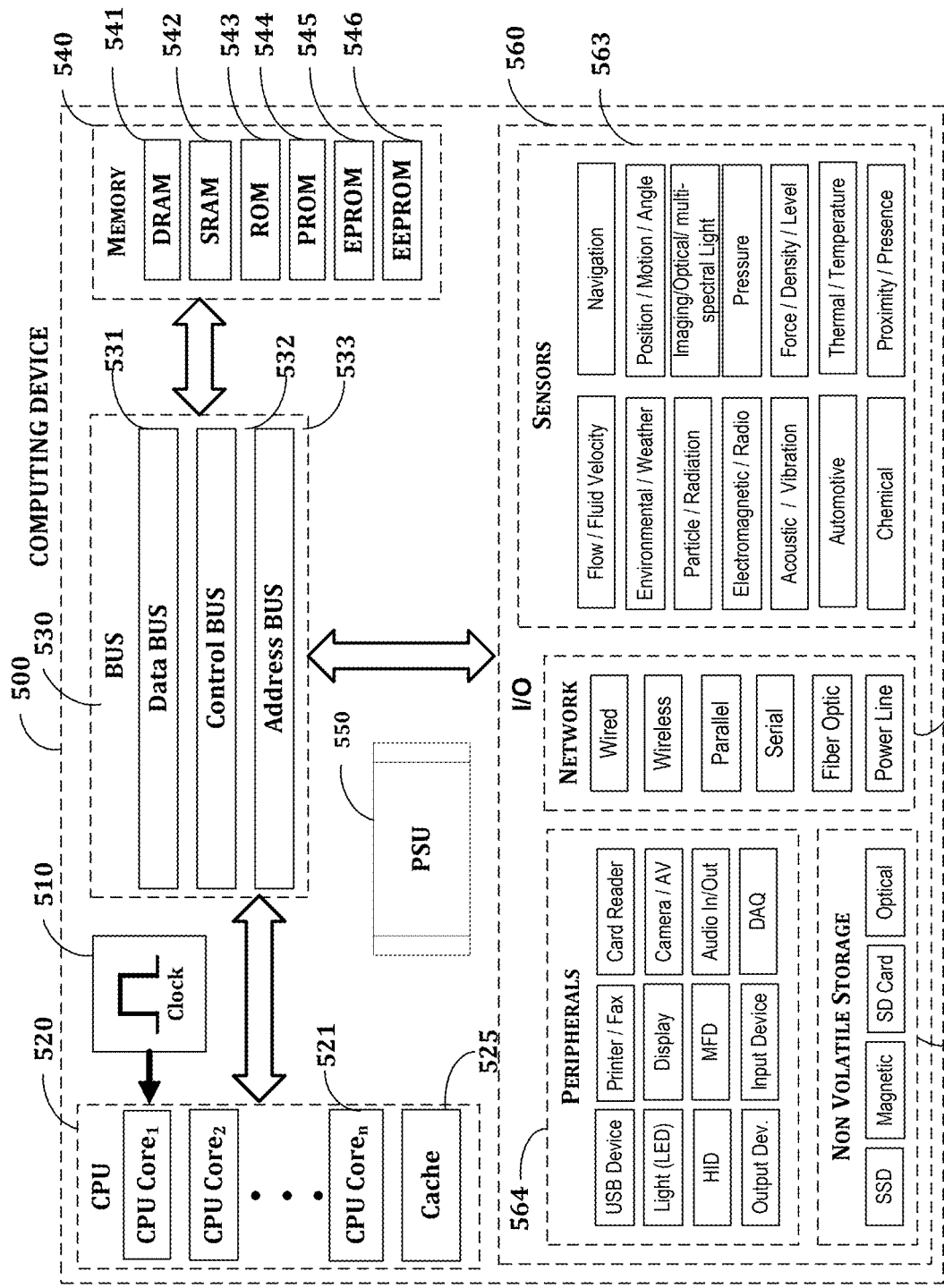
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The DIV node 102 (see FIG. 2) may be hosted on a centralized server or on a cloud computing service. Although method 300 has been described to be performed by the DIV node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 540, a power supply unit (PSU) 550, and one or more Input/Output (I/O) units. The CPU 520 coupled to the memory unit 540 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 540, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 540 may be implemented with computing device 500 or any of other computing devices 500, in combination with computing device 500. The aforementioned system, device, and components are examples and other systems, devices, and components may comprise the aforementioned CPU 520, the bus 530, the memory unit 540, consistent with embodiments of the disclosure.

At least one computing device 500 may be embodied as any of the computing elements illustrated in all of the attached figures, including the DIV node 102 (FIG. 2). A computing device 500 does not need to be electronic, nor even have a CPU 520, nor bus 530, nor memory unit 540. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 540, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 540 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 540, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu}Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 540. The memory 540 operates at high speed, distinguishing it from the non-volatile storage sub-module 561, which may be referred to as secondary or tertiary storage, which provides slow-to-access information but offers higher capacities at lower cost. The contents contained in memory 540, may be transferred to secondary storage via techniques such as, but not limited to, virtual memory and swap. The memory 540 may be associated with addressable semiconductor memory, such as integrated circuits consisting of silicon-based transistors, used for example as primary storage but also other purposes in the computing device 500. The memory 540 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 541, Static Random-Access Memory (SRAM) 542, CPU Cache memory 545, Advanced Random-Access Memory (A-RAM), and other types of primary storage such as Random-Access Memory (RAM).
Non-volatile memory which can retain stored information even after power is removed, for example, but not limited to, Read-Only Memory (ROM) 543, Programmable ROM (PROM) 545, Erasable PROM (EPROM) 545, Electrically Erasable PROM (EEPROM) 546 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 540. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (*UDO*).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G,5G (such as WiMax and LTE), and 5G (short and long wavelength).
- Parallel communications, such as, but not limited to, LPT ports.
- Serial communications, such as, but not limited to, RS-232 and USB.
- Fiber Optic communications, such as, but not limited to, Single-mode optical fiber (SMF) and Multi-mode optical fiber (MMF).
- Power Line and wireless communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor ($O_2$), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system for an automated real-time digital identity verification based on predictive analytics of user identity data, comprising:
    a processor of a digital identity verification (DIV) node configured to host a machine learning (ML) module and connected to at least one verifier entity node over a network; and a memory on which are stored machine-readable instructions that when executed by the processor, cause the processor to:
    acquire an identity verification request associated with a user from the at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document;
    parse the identity verification request to derive a plurality of key features;
    generate at least one feature vector based on the plurality of the key features; and provide the at least one feature vector to the ML module configured to execute a predictive model based on underlying neural network configured to produce at least one user identity verification parameter for generation of a user identity verification verdict; and
    analyze the at least one user identity verification parameter to determine if at least one variable of the at least one user identity verification parameter deviates from a pre-set parameter value by a margin exceeding a pre-set threshold value; and
    responsive to the at least at least one variable of the at least one user identity verification parameter deviating from a pre-set parameter value by a margin exceeding a pre-set threshold value, generate an updated user identity verification verdict based on at least one new user identity verification parameter produced by the predictive model in response to the updated feature vector.

2. The system of claim 1, wherein the instructions further cause the processor to query a local database to retrieve local historical user identifications'-related data associated with previous user identification verification parameters based on the plurality of key features.

3. The system of claim 1, wherein the instructions further cause the processor to derive a language indicator from the user biographic data acquired from the identification document and to parse the user biographic data based on the language indicator to derive a plurality of key features.

4. The system of claim 2, wherein the instructions further cause the processor to retrieve remote historical user identifications'-related data associated with previous user identification verification parameters based on the local historical user identifications' related data, wherein the remote historical user identifications'-related data is collected at third-party verification entities.

5. The system of claim 4, wherein the instructions further cause the processor to generate the at least one feature vector based on the plurality of key features, the local historical user identifications'-related data combined with the remote historical user identifications'-related data.

6. The system of claim 1, wherein the instructions further cause the processor to record the at least one user identity verification parameter on a blockchain ledger along with the key features retrieved from the identity verification request.

7. The system of claim 6, wherein the instructions further cause the processor to retrieve the user identity verification verdict from the blockchain responsive to a consensus among the DIV node and the pre-set number of verification entity nodes onboarded on the blockchain.

8. The system of claim 7, wherein the instructions further cause the processor to execute a smart contract to record data reflecting generation of the user identity verification verdict associated with the identity verification request on the blockchain for future audits.

9. A method for an automated real-time digital identity verification based on predictive analytics of user identity data, comprising:
    acquiring, by a digital identity verification (DIV) node configured to host a machine learning model, an identity verification request associated with a user from at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document;
    parsing, by the DIV node, the identity verification request to derive a plurality of key features;
    generating, by the DIV node, at least one feature vector based on the plurality of the key features; and
    providing, by the DIV node, the at least one feature vector to the ML module configured to execute a predictive model based on underlying neural network configured to produce at least one user identity verification parameter for generation of a user identity verification verdict;
    analyzing, by the DIV node, the at least one user identity verification parameter to determine if at least one variable of the at least one user identity verification parameter deviates from a pre-set parameter value by a margin exceeding a pre-set threshold value; and
    responsive to the at least at least one variable of the at least one user identity verification parameter deviating from a pre-set parameter value by a margin exceeding a pre-set threshold value, generating, by the DIV node, an updated user identity verification verdict based on at least one new user identity verification parameter produced by the predictive model in response to the updated feature vector.

10. The method of claim 9 further comprising querying a local database to retrieve local historical user identifications'-related data associated with previous user identification verification parameters based on the plurality of key features.

11. The method of claim 10 further comprising retrieving remote historical user identifications'-related data associated with previous user identification verification parameters based on the local historical user identifications'-related data, wherein the remote historical user identifications'-related data is collected at third-party verification entities.

12. The method of claim 11, further comprising generating the at least one feature vector based on the plurality of key features, the local historical user identifications'-related data combined with the remote historical user identifications'-related data.

13. The method of claim 9, further comprising recording the at least one user identity verification parameter on a blockchain ledger along with the key features retrieved from the identity verification request.

14. A non-transitory computer-readable medium comprising instructions, that when read by a processor, cause the processor to perform:

acquiring an identity verification request associated with a user from at least one verifier entity node, wherein the identity verification request comprising user biographic data and a truncated facial biometric hash extracted from a digital identity feature embedded into an identification document of the user and user biographic data acquired from the identification document and a facial biometric hash generated from the user identification document;

parsing the identity verification request to derive a plurality of key features; generating at least one feature vector based on the plurality of the key features; and providing the at least one feature vector to a machine learning module configured to execute a predictive model based on underlying neural network configured to produce at least one user identity verification parameter for generation of a user identity verification verdict;

analyzing the at least one user identity verification parameter to determine if at least one variable of the at least one user identity verification parameter deviates from a pre-set parameter value by a margin exceeding a pre-set threshold value; and responsive to the at least at least one variable of the at least one user identity verification parameter deviating from a pre-set parameter value by a margin exceeding a pre-set threshold value, generating an updated user identity verification verdict based on at least one new user identity verification parameter produced by the predictive model in response to the updated feature vector.

\* \* \* \* \*